US007223075B2

(12) United States Patent
Schmitt

(10) Patent No.: US 7,223,075 B2
(45) Date of Patent: May 29, 2007

(54) TURBINE WHEEL FOR DRIVING RAPIDLY ROTATING TOOLS

(75) Inventor: Bernhard Schmitt, Wiesbaden (DE)

(73) Assignee: GAT Gesellschaft für Antriebstechnik mbH, Wiesbaden (DE)

( * ) Notice: Subject to any disclaimer, the term of this patent is extended or adjusted under 35 U.S.C. 154(b) by 295 days.

(21) Appl. No.: 10/768,880

(22) Filed: Jan. 29, 2004

(65) Prior Publication Data

US 2004/0184916 A1 Sep. 23, 2004

(30) Foreign Application Priority Data

Jan. 30, 2003 (DE) ................................ 103 03 617

(51) Int. Cl.
*B05B 3/02* (2006.01)
*F01D 5/12* (2006.01)

(52) U.S. Cl. .............. 416/185; 416/223 A; 416/223 B; 416/238; 416/243; 416/DIG. 2; 416/DIG. 5; 239/224; 239/240

(58) Field of Classification Search ................ 416/178, 416/185, 186 R, 187, 223 A, 223 B, 238, 416/243, DIG. 2, DIG. 5; 415/202; 239/223–224, 239/240

See application file for complete search history.

(56) References Cited

U.S. PATENT DOCUMENTS

| | | | | |
|---|---|---|---|---|
| 289,958 | A * | 12/1883 | Bevans | 415/202 |
| 1,294,050 | A * | 2/1919 | Chute | 415/202 |
| 2,836,464 | A * | 5/1958 | Dickinson | 239/240 |
| 3,121,533 | A * | 2/1964 | Sedlacsik, Jr. | 239/224 |
| 3,140,042 | A * | 7/1964 | Fujii | 416/243 |
| 3,421,697 | A | 1/1969 | Marks | |
| 3,804,335 | A | 4/1974 | Sohre | |
| 3,968,935 | A | 7/1976 | Sohre | |
| RE29,128 | E | 2/1977 | Sohre | |
| 4,565,322 | A * | 1/1986 | Graber | 239/223 |
| 5,733,080 | A * | 3/1998 | David et al. | 409/132 |

(Continued)

FOREIGN PATENT DOCUMENTS

DE 32 15560 C3 11/1983

(Continued)

OTHER PUBLICATIONS

Doty et al., "High-Efficiency Microturbine Technology," IEEE, Proceedings of the Intersociety Energy Conversion Engineering Conference, vol. 2, pp. 436-442, (Aug. 1991).

*Primary Examiner*—Richard A. Edgar
(74) *Attorney, Agent, or Firm*—The Maxham Firm

(57) ABSTRACT

A turbine wheel for driving rapidly rotating tools, in the form of a circular disk or ring, configured for mounting so as to be rotatable about an axis. Disposed thereon in circular formation are turbine blades having axially parallel front and back faces curved in the radial direction. The front face has a lesser radius of curvature ($R_3$, $R_4$), at least in portions, than the back face. This feature allows the turbine wheel to fit into the conventional turbine housings without relatively major redesign and with, at most, slight modifications. The turbine wheel can achieve higher torque than previous turbine wheels at the required high rotational speeds. Thus, a greater quantity of material can be applied to the spraying dome or a spraying disk without a detrimental braking. Surfaces to be sprayed can be provided with a uniform coat of material in shorter time.

31 Claims, 2 Drawing Sheets

U.S. PATENT DOCUMENTS

| | | | | | |
|---|---|---|---|---|---|
| 6,007,300 | A * | 12/1999 | Saeki et al. | 416/178 |
| 6,056,215 | A * | 5/2000 | Hansinger et al. | 239/703 |
| 6,261,051 | B1 * | 7/2001 | Kolacny | 415/224 |
| 2002/0038827 | A1 | 4/2002 | Fujii et al. | |
| 2004/0164190 | A1 * | 8/2004 | Baumann et al. | 239/223 |

FOREIGN PATENT DOCUMENTS

| | | | |
|---|---|---|---|
| DE | 37 16776 | A1 | 12/1987 |
| DE | 198 16 648 | A1 | 11/1998 |
| DE | 197 21 615 | A1 | 12/1998 |
| EP | 0 984 136 | A1 | 8/2000 |
| GB | 1 474 134 | A2 | 5/1977 |
| GB | 2190606 | A * | 11/1987 |
| WO | WO 95/09062 | A1 | 4/1995 |

* cited by examiner

TURBINE WHEEL FOR DRIVING RAPIDLY ROTATING TOOLS

BACKROUND OF THE INVENTION

1. Field of the Invention

The present invention relates to rotating tools, more particularly to turbine wheels for driving rapidly rotating tools.

2. Discussion of Related Art

Turbine wheels for painting equipment are already in use. In these, the paint-spraying domes emit a colored lacquer and are made to rotate rapidly by the turbines. They are constructed so that, due to the rapid rotation of the dome, the paint or respective lacquer applied to the dome is atomized into very small droplets and is deposited on a surface that is to be lacquered or painted. The rotational speeds of the rotating paint domes required for producing as fine an atomization as possible are up to 70,000 rpm. Consequently, the corresponding turbines are air-suspended. These apparatus are used primarily in the painting of vehicle bodies.

In this context, the attainable turbine rotational speed is also dependent on the quantity of paint or lacquer emitted by the spraying dome or a corresponding spraying disk. The lacquer guided onto the spraying dome must also be accelerated through the spraying dome. A braking effect occurs during this event. Therefore, in order that the rotational speed of the turbine is not excessively reduced, which would have a detrimental effect on the evenness and fineness of the droplet formation, the quantity of paint or lacquer to be applied to the dome in any unit of time is limited. This limitation is typically about 400 ml to about 450 ml per minute.

SUMMARY OF THE INVENTION

In this invention a turbine wheel is provided for driving rapidly rotating tools, particularly for the rotating disks and/or domes of paint-spraying apparatus. These have a carrier plate, in the form of a circular disk or ring, mounted so as to be rotatable about an axis. The turbine blades have axially parallel front faces and back faces, which are curved in the radial direction, that is, perpendicular to the axis of the turbine wheel. The front faces have a lesser radius of curvature, at least in portions, than the back faces.

In this context, the front faces are understood to be the turbine blade faces which are at the front in the direction of rotation of the turbine wheel. The back faces are accordingly the blade faces at the back in the direction of rotation of the turbine wheel.

One purpose of the invention is to provide a turbine, or turbine wheel, which fits into conventional turbine housings with, at most, slight modification, and which has an even higher torque than previous turbine wheels at the required high rotational speeds. A greater quantity of lacquer can be applied to the spraying dome or a spraying disk without a detrimental braking effect, so that surfaces to be painted can be provided with a uniform coat of paint in an even shorter time than was previously possible.

This purpose is achieved by providing the radially outer portions on both the front face and the back face of the turbine blades with a greater curvature, or lesser radius of curvature, than the radially more inward portions of the front and back face. At the same time, however, the axial parallelism of the front faces and back faces of the turbine blades is maintained.

The individual turbine blades have a constant profile over their axial length, making possible the production of respective profiles in long lengths corresponding to a multiple of the axial length of an individual turbine blade. The individual turbine blades are produced by cutting off or paring off a corresponding portion from this profile. This makes exceptionally efficient production possible. It is also not a significant problem if the radially outer portions of the turbine blades, that is, in the finished turbine wheel, the portions distant from the center of the turbine wheel, have a lesser radius of curvature, and consequently a greater curvature than the radially inward portions of the turbine blades. This is the case on both the front side and the back side of the turbine blades.

It has been found that such a profile of the turbine blades generates fewer interfering eddies, and results in a more circular and more even running of a turbine wheel with a stable torque. At the same time, the turbine blade design also enables the axial length of the blades to be increased. In conventional turbine blades used for air-suspended turbines with high rotational speeds (70,000 rpm), the axial length of the turbine blade is only approximately 50% of the radial extent of the turbine blades, that is, the difference between the external radius and the internal radius of the blade ring.

By contrast, in the present invention the axial length of a turbine blade is at least 60%, and preferably more than 65%, of the radial extent of the respective turbine blade. An axial blade length which is approximately 70% of the radial extent of the blade has been found to be expedient and easily controllable. If possible, a value of no more than approximately 80%, but at most, approximately 100%, should not be exceeded for the axial length of the blades relative to their radial extent.

It is also preferred that the ratio of the radial extent of the blades or of the blade ring, which is the difference between the external radius and the internal radius of the blade ring relative to the radius of the turbine wheel, which is the external radius of the blade ring, is approximately 20%.

In principle, for the turbine blades the front face has a lesser radius of curvature, at least along a portion thereof, than the corresponding opposite portion of the back face. However, the radially outer portion of each turbine blade also has a lesser radius of curvature, on both the outer face and the inner face, than the corresponding inner portion of these faces. Even where, for example, the outer portion has a lesser radius of curvature on the front face than the outer portion of the back face, the radially inward portion of the front face nevertheless has a greater radius of curvature than the radially outer portion of the back face.

In a preferred embodiment of the invention, the radii of curvature of the inward portions of the front face and of the back face are relatively similar. The radius of curvature of the back face is preferably between 0 and 10% greater, in the radially inward portion, than the radius of curvature of the inward portion of the front face. The radius of curvature of the inward portion of the back face may also, if necessary, be up to 5% less than the radius of curvature of the radially inward portion of the front face or, conversely, it may also be up to 15% greater.

The radially outer portions of the front face and the back face generally differ somewhat markedly, typically between 10% and 50% relative to the lesser radius of the outer portion of the front face. Thus, the radius of curvature of the inward portion of the back face is 10% to 50% greater. For the radius of curvature of the back faces, a radius of curvature which is approximately 30% greater than the radius of curvature of the outer portion of the back face has been found to be preferred.

The centers of curvature of the inward and outer portion of the front face are located, relative to the axis of the turbine wheel, at a somewhat greater distance from the axis of the turbine wheel than the centers of curvature of the respective corresponding portions of the back faces. The centers of curvature of the radially inward portions are both, in addition, at a greater distance from the turbine axis than the two centers of curvature of the respective radially outer portions of the front face and the back face.

The respective differently curved portions of the front face and also of the back face preferably merge smoothly into one another, without any discontinuity or break. They have a continuous first derivative. This is most easily achieved having the transition point located precisely at the intersection of the connecting line through the centers of curvature of the respective outer and inward portions.

The turbine blade is fashioned so that, relative to the radial extent of the turbine blade, the radially inward portion of both the front face and the back face comprise at least 30% of this axial extent. Conversely, the radially outer portion of the front face and of the back face, which is defined with a respectively lesser radius of curvature relative to the inward portion, comprise at least 30% of the axial extent of the blade. In practice, it is found to be preferred if each of the radially inward and outer portions of both the front face and the back face respectively comprise approximately 50% of the radial extent of the turbine blade. However, the angular ranges over which the respective inward and outer portions extend differ markedly from one another. This is also related, inter alia, to the different radii of curvature, since the angular range over which a given curved portion extends is respectively related to its center of curvature. It is preferable if the angular range over which the radially inward portion of the back face extends is between 28° and 40°, more preferably between 30° and 35°, and still more preferably, approximately 33°. It is preferred if the angle of curvature of the radially outer portion of the back face is in the range between 60° and 90°, preferably being 70°±5°. On the front face, the corresponding angular ranges are somewhat greater, since the radii of curvature are smaller and the curvature is greater. The distance from the inner edge to the outer edge is at the same time longer on the front face of the turbine blades than on the back side. Consequently, the angle over which the radially inward portion of the front face extends is between 30° and 45°, preferably approximately 40°±2°. The angular range over which the radially outer portion of the front face extends is between 100° and 130°, preferably 115°±5°. This is related in each case to the center of curvature of the curved portion concerned.

It preferred and favorable with respect to turbine performance, if the turbine blades are tilted forward out of exact radial alignment of their connecting line between the inner and outer edge, so that the radially outer edge of the turbine blade is somewhat ahead of the inner edge in the direction of rotation. It is also preferred that the angle between the connecting line of the outer and inner edge of a turbine blade be inclined by an angle of between 5° and 12°, preferably by approximately 8° to −1°, relative to the turbine-wheel radius vector directed toward the inner edge of the turbine blade.

In addition, in a preferred embodiment, the pitch, which is understood herein as the distance between successive turbine blades in the circumferential direction, is 10° to 15°. More preferably the pitch is approximately 12°. This angle is measured in each case between corresponding points of the adjacent turbine blades. Accordingly, the total number of turbine blades disposed in a ring formed on the outer circumference of the turbine wheel is between 24 and 36, and 30 is preferred for some purposes.

Preferably the inner edge and the outer edge of a turbine blade are each rounded off by a small radius. The inner edge is somewhat more acute-angled than the outer edge and has, for example, a radius of curvature of less than 0.1 mm, preferably of less than 0.05 mm. More preferably, the inner edge has a radius of curvature of 0.025 mm, whereas the outer edge has a radius of curvature of less than 0.3 mm, preferably of less than 0.2 mm, but greater than 0.1 mm.

BRIEF DESCRIPTION OF THE DRAWING

Further particularities and advantages of the invention will become clear from the following description of preferred embodiments with reference to the drawing, in which.

DETAILED DESCRIPTION OF THE PREFERRED EMBODIMENTS

Figure 2:
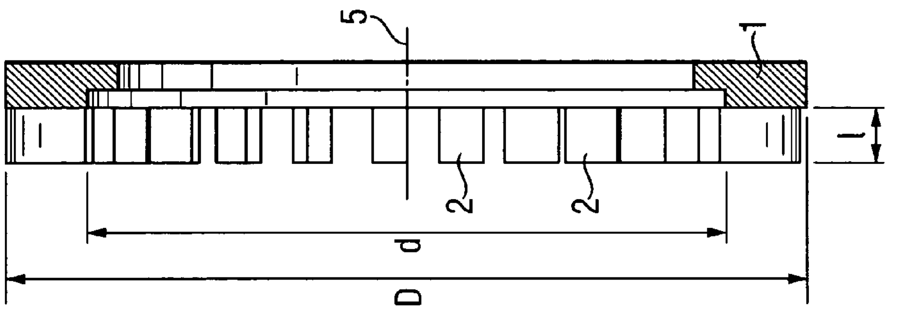
FIG. 2 shows a sectional view of the turbine wheel represented in FIG. 1, with a section along the line II—II in FIG. 1.
Figure 1:
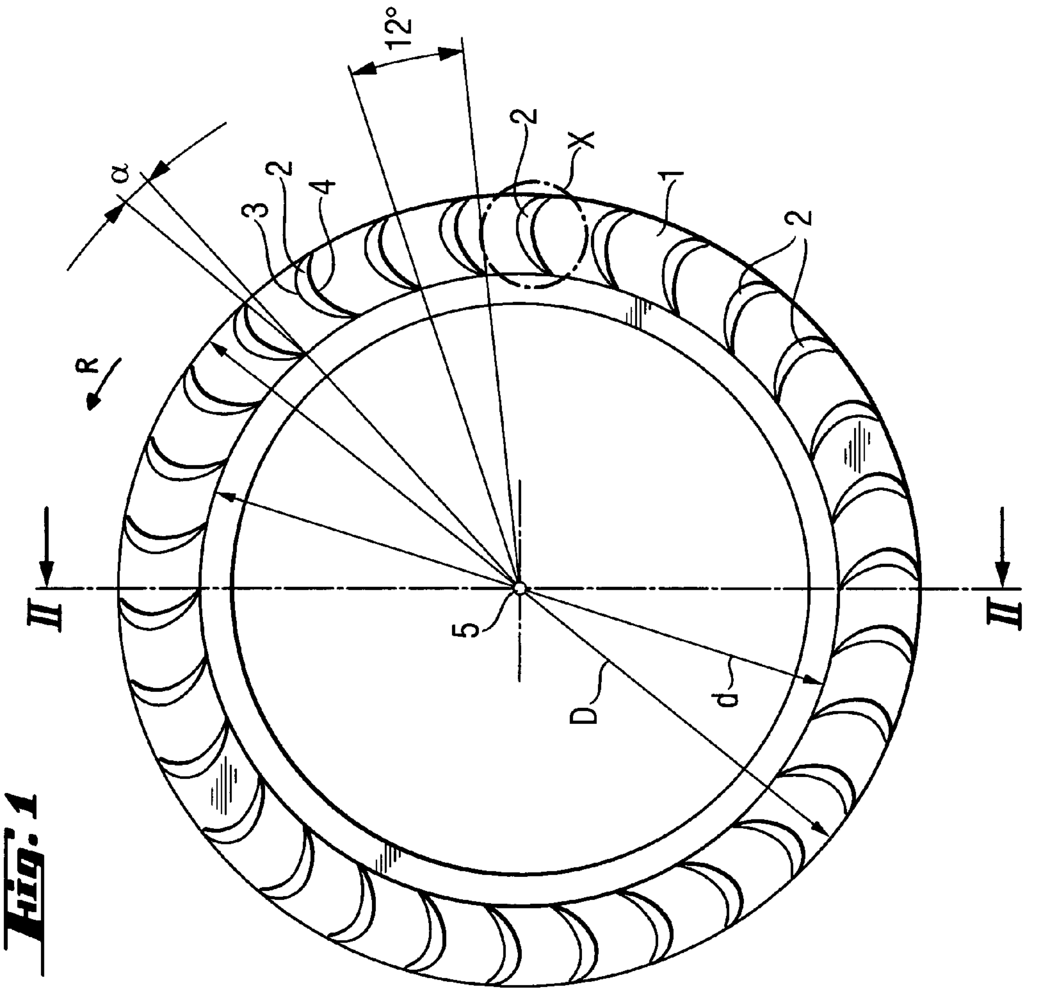
FIG. 1 is a top view of a turbine wheel along the axis, with a ring of turbine blades disposed along the outer circumference of the wheel, configured in accordance with the invention.

FIG. 1 shows a turbine wheel with carrier plate 1, in the form of a circular disk, which has an external diameter "D." On the outer margin of carrier plate 1 is a ring of turbine blades 2, the outer edges of the turbine blades being located approximately on the outer circumference, whereas the inner edges of the blade wheel ring define an inner diameter "d," as also indicated in FIG. 2. Specifically, the values for "d" are between about 40 and 48 mm, preferably aboout 44 mm, and the values for "D" are between about 50 and 60 mm, preferably 55 mm, the difference "D–d" being approximately 20% of "D." The corresponding radii, of course, are half the respective diameter values.

As also shown in FIG. 1, the individual blades are tilted forward by an angle "α" relative to the radial direction, such that the outer edge of a turbine blade is somewhat ahead of the inner edge in the direction of rotation "R." Specifically, the angle "α," which is the angle of a connecting line of the outer edge and inner edge of a blade relative to the radius vector to the inner edge of the blade, is approximately 8°±1°. However, the angle "α" can be in the range of 2° to 15°, preferably in the range of 5° to 12°.

In this embodiment, the angular pitch between the blades is 12° so that a total of 30 turbine blades 2 are distributed over the circumference. Instead of a circular disk, turbine wheel 1 could also consist of a ring with spokes and turbine blades 2 disposed along the ring.

Figure 3:
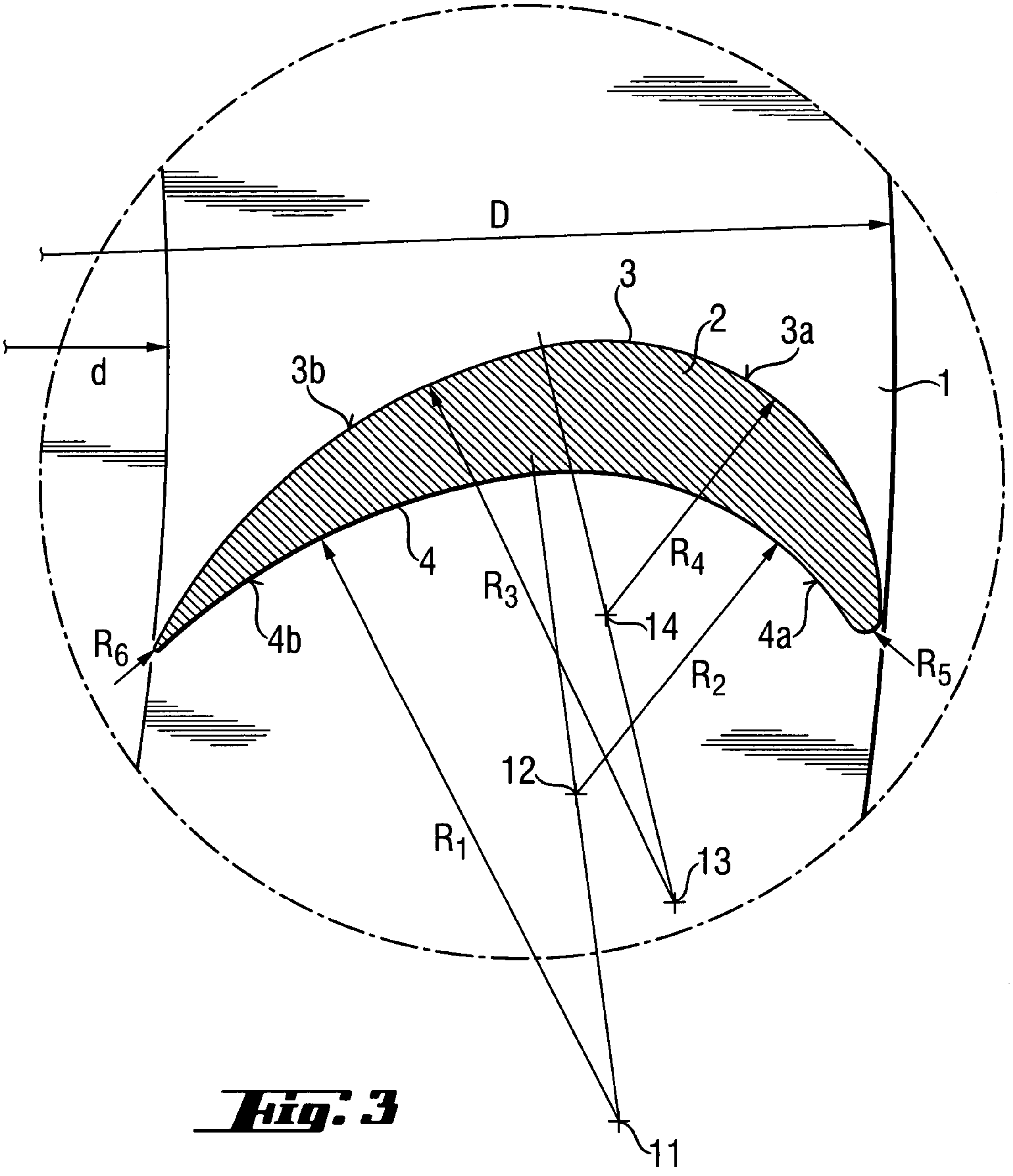
FIG. 3 shows a detail from FIG. 1, with a single turbine blade.

FIG. 3 shows a detail from carrier plate 1 of a turbine wheel, with a single turbine blade 2 represented in cross-section. Turbine blade 2 has curved front face 3 and back face 4, which is also curved. The front face consists of radially outer portion **3*a* and radially inward portion 3*b*, while back face 4 consists of radially outer portion 4*a* and radially inward portion 4*b*. In the axial direction, the profile of turbine blade 2 is constant such that front face 3 and back face 4** are axially parallel.

The transition from the front face to the back face at the inner edge and at the outer edge of turbine blade 2 is effected on the outside via radius of curvature $R_5$ of approximately 0.15 mm or even somewhat less, and in the region of the inner edge, via radius of curvature $R_6$, which is substantially less than 0.1 mm, for example, approximately 0.025 mm, but greater than 0.001 mm.

Radially inward and outer portions 3*b*, 3*a*, respectively, of front face 3 and also corresponding radially inward and outer portions 4*b*, 4*a* of back face 4, each have different radii of curvature and also differently disposed centers of curvature. Radially inward portion 4*b* has radius of curvature $R_1$ and center of curvature 11. In the case of turbine blade 2 mounted on the turbine wheel, this center of curvature 11 is located somewhat closer to axis 5 of the turbine wheel than is center of curvature 13 of radially inward portion 3*b* of front face 3. Radially outer portion 3*a* has a radius of curvature $R_4$ and inner portion 3*b* has a radius of curvature $R_3$. Center of curvature 14 in this case is located radially further outside, relative to turbine axis 5, than center of curvature 12 of radially outer portion 4*a* of the back face. Radially outer portion 4*a* has a radius of curvature $R_2$.

Center of curvature 14 of radially outer portion 3*a* of front face 3 is again located closer to the turbine axis than is center of curvature 13 of the radially inward portion of front face 3. However, it is slightly more distant from axis 5 of the turbine than center of curvature 12 of radially outer portion 4*a* of back face 4.

Overall, for the four radii of curvature of the front and back faces in the preferred version of the invention, the relationship: $R_4<R_2<R_3<R_1$ applies. The factor between $R_2$ and $R_4$ is approximately 1.3, the factor between $R_3$ and $R_2$ is approximately 2, and the factor between $R_1$ and $R_3$ is approximately 1.1. However, these factors may also vary by 10% in both directions. From the relationships above, and from FIG. 3, it can be deduced that the radii of curvature $R_1$, $R_3$, of the inward portions 4*b*, 3*b* of the blade are at least 50%, and preferably about 100%, greater than the radii of curvature $R_2$, $R_4$ of the radially outer portions 4*a*, 3*a* of back faces 4 and front faces 3, respectively. Further, the radius of curvature of radially inward portion 3*b*, 4*b* is no more than about four times the radius of curvature of the corresponding radially outer portion 3*a*, 4*a*. The radius of curvature of the radially outer portion of the back face 4*a* is between about 5% and 50% greater than the radius of curvature of the radially outer portion of the front face 3*a*.

The transition between portion 3*a* and portion 3*b* on front face 3 is located exactly on the line of intersection of front face 3 with a straight line joining centers of curvature 13 and 14. The transition between portions 4*a* and 4*b* of back face 4 is located on the point of intersection of back face 4 with a straight line through centers of curvature 11, 12 of these two portions. It is thereby ensured that the transition between the different radii is effected smoothly and without any discontinuity, since the tangents of the respectively differently curved portions coincide exactly in the thus defined transition points.

As can also shown in FIGS. 1 and 2, which are represented in the same scale, the length of turbine blade 2 in relation to its radial extent, that is, in relation to the difference between the external radius and the internal radius of the blade ring, is approximately 68%. The preferred range is between about 65% and 70%. If possible, a value of approximately 80%, but at most, approximately 100%, should not be exceeded for the axial length of the blades relative to their radial extent. Stated another way, the axial length of the turbine blades is approximately 70% ±5% of the radial extent of the turbine blades. In addition to the special profile and the special arrangement of the turbine blades on the turbine wheel, this greater axial length in relation to the radial extent of the blades is also conducive to improved and stable turbine performance, and to a greater torque at high rotational speeds.

Compared with conventional turbine wheels having the same external dimensions, the turbine wheel according to the invention achieves a spraying performance approximately 100% greater, with equal quality.

At the same time, the design and arrangement of the turbine blades in this invention result in virtually no increase, or only an insignificant increase, in difficulty in production of the turbine wheel. Since the turbine blades are produced from correspondingly longer profiles simply through paring off portions of a desired length, which corresponds to the axial length l of the turbine blades, the production of the new blade profile does not require an appreciably greater input. The profile is constant over the long length of corresponding prefabricated profile elements. Nor does the slightly tilted disposition of the blades require any increased assembly or production input. This also applies to the increased axial length of the blades. The greatly increased performance of the turbine wheel of the invention makes the slightly increased effort in production insignificant.

While the present invention has been illustrated and described by means of specific embodiments, it is to be understood that numerous changes and modifications can be made therein without departing from the spirit and scope of the invention. Accordingly, the invention is limited only by the claims.

What is claimed is:

1. A turbine wheel for driving rapidly rotating tools for rotating disks and/or domes of paint-spraying apparatus, said turbine wheel comprising:

a carrier plate formed as a circular disk or ring, said plate having a central axis and configured for mounting so as to be rotatable about the axis;

turbine blades disposed on the carrier plate in circular formation and curved in a direction perpendicular to the axis, said turbine blades comprising;

a convex front face including a convex radially outer portion and a convex radially inward portion; and a convex back face, including a convex radially outer portion and a convex radially inward portion, wherein said front face and back face are mounted so that said front and back faces are axially parallel;

wherein each of said faces has radially outer portions and radially inward portions with radii of curvature, such that at least portions of the front face have a lesser radius of curvature than both the radially outer and the radially outer portion of the concave back face, and the radially outer portions of the front face and of the back face have a lesser radius of curvature than the radially more inward portions of the front face and of the back face.

2. The turbine wheel according to claim 1, wherein the radially inward portions of the front faces and of the back faces, respectively comprise at least 30% of the radial extent of a turbine blade, while the radially outer portions of the front faces and back faces, respectively comprise at least 30% of the radial extent of the turbine blades.

3. The turbine wheel according to claim 2, wherein the radii of curvature of the radially inward portions are at least 50%, or preferably 100%, greater than the radii of curvature of the corresponding radially outer portions of the front faces and back faces, respectively.

4. The turbine wheel according to claim 3, wherein the radius of curvature of a radially inward portion is no more than about four times the radius of curvature of the corresponding radially outer portion.

5. The turbine wheel according to one of claim 4, wherein the radius of curvature of the radially outer portion of the back face is between about 5% and 50% greater than the radius of curvature of the radially outer portion of the front face.

6. The turbine wheel according to claim 5, wherein the radius of curvature of the radially inward portion of the back face differs by up to 5% less than the radius of curvature of the radially inward portion of the front face, or differs by up to 15% more than the radius of curvature of the radially inward portion of the front face.

7. The turbine wheel according to claim 6, wherein the front face and the back face respectively have essentially two different radii of curvature, the different curvature portions merging smoothly into one another, with a continuous first derivative.

8. The turbine wheel according to claim 6, wherein the radius of curvature of the radially inward portion of the back face differs from the radius of curvature of the radially inward portion of the front face by about 0 to 10%.

9. The turbine wheel according to claim 2, wherein the radii of curvature of the radially inward portions are greater than the radii of curvature of the corresponding radially outer portions of the front faces and back faces, respectively.

10. The turbine wheel according to claim 1, wherein the axial length of the turbine blades is at least 60%, of the radial extent of the turbine blades.

11. The turbine wheel according to claim 10, wherein the axial length of the turbine blades is approximately 70%±5% of the radial extent of the turbine blades.

12. The turbine wheel according to claim 1, wherein the axial length of the turbine blades is at least 65% of the radial extent of the turbine blades.

13. The turbine wheel according to claim 1, wherein the axial length of the turbine blades is at most approximately 100% of the radial extent of the blades.

14. The turbine wheel according to claim 1, wherein the axial length of the turbine blades is no more than 80% of the radial extent of the blades.

15. The turbine wheel according to claim 14 wherein the axial length of the turbine blades is approximately 70%±5% of the radial extent of the turbine blades.

16. The turbine wheel according to claim 1, wherein the blade further comprises an angular range over which the radially inward portion of the back side of the blade extends is between 28° and 40°, and the angular range over which the radially outer portion of the back side of the turbine blade extends is between 60° and 90° in each case relative to the center of curvature of the respective portions.

17. The turbine wheel according to claim 16, wherein the angular range over which the radially inward portion of the front face of the turbine blade extends is in an angular range between 35° and 45°, and the angular range over which the radially outer portion of the front face of the turbine blade extends is between 100° and 130°, in each case relative to the center of curvature of the respective portions.

18. The turbine wheel according to claim 1, wherein the transition of the radii of curvature from the radially inward to the radially outer portion is in each case located on a line connecting the centers of curvature of the respective radially inward and radially outer portion.

19. The turbine wheel according to claim 1, wherein the blade further comprises an angular range over which the radially inward portion of the back side of the blade extends is between 30° and 35°, and the angular range over which the radially outer portion of the back side of the turbine blade extends is 70°±5° in each case relative to the center of curvature of the respective portions.

20. The turbine wheel according to claim 19, wherein the angular range over which the radially inward portion of the front face of the turbine blade extends is approximately 40°±2°, and the angular range over which the radially outer portion of the front face of the turbine blade extends is 115°±5°in each case relative to the center of curvature of the respective portions.

21. A turbine wheel for driving rapidly rotating tools, particularly for the rotating disks and/or domes of paint-spraying apparatus, said turbine wheel comprising:

a carrier plate formed as a circular disk or ring, said plate having a central axis and configured for mounting so as to be rotatable about the axis;

turbine blades disposed on the carrier plate in circular formation and curved in a direction perpendicular to the axis, said turbine blades comprising;

a convex front face including a convex radially outer portion and a convex radially inward portion; and a concave back face, including a concave radially outer portion and a concave radially inward portion, wherein said front face and back face are mounted so that said front and back faces are axially parallel;

wherein each of said faces has radially outer portions and radially inward portions with radii of curvature, such that at least portions of the front face have a lesser radius of curvature than both the radially inner and the radially outer portion of the concave back face, and the radially outer portions of the front face and of the back face have a lesser radius of curvature than the radially more inward portions of the front face and of the back face and, wherein in a section perpendicular to the axis, the connecting line of the radially inward edge and of the radially outer edge of a turbine blade is inclined relative to a radius vector to the inner edge of the turbine blade, this being such that the outer edge of the turbine blade is ahead of the inner edge in the direction of rotation, the connecting line being inclined by 2° to 15° relative to the radius vector directed toward the inner edge of the turbine blade.

22. The turbine wheel according to claim 21, wherein the turbine blades further comprise inner and outer edges that are respectively rounded off with a small radius, the rounding radius of the inner edge being less than 0.1 mm and greater than 0.01 mm, and the rounding radius of the outer edge being less than 0.3 mm but greater than 0.1 mm.

23. The turbine wheel according to claim 22, wherein the turbine blade further comprises a pitch in the circumferential direction between 10° and 15°.

24. The turbine wheel according to claim 23, wherein the blade ring further comprises an internal radius between 20 mm and 24 mm.

25. The turbine wheel according to claim 24, wherein the blade ring further comprises an external radius between 25 mm and 30 mm.

26. The turbine wheel according to claim 21, wherein the connecting line of the radially inward edge and the radially outer edge of a turbine blade is inclined by about 5° to 12° relative to the radius vector directed toward the inner edge of the turbine blade.

27. The turbine wheel according to claim 21, wherein the connecting line of the radially inward edge and the radially outer edge of a turbine blade is inclined by about 8°±1° relative to the radius vector directed toward the inner edge of the turbine blade.

28. The turbine wheel according to claim 21, wherein the turbine blades further comprise inner and outer edges that are respectively rounded off with a small radius, the rounding radius of the inner edge being less than 0.05 mm and greater than 0.01 mm, and the rounding radius of the outer edge being less than 0.2 mm but greater than 0.1 mm.

29. The turbine wheel according to claim 28, wherein the turbine blade further comprises a pitch in the circumferential direction of approximately 12°.

30. The turbine wheel according to claim 29, wherein the blade ring further comprises an internal radius of approximately 22 mm.

31. The turbine wheel according to claim 30, wherein the blade ring further comprises an external radius of approximately 27.5 mm.

* * * * *